United States Patent
Sanford, Jr.

[11] Patent Number: 6,076,940
[45] Date of Patent: Jun. 20, 2000

[54] PLANTER LIGHT ACCESSORY

[76] Inventor: Sammie J. Sanford, Jr., 24036 Rosewood, Oak Park, Mich. 48237

[21] Appl. No.: 09/116,172

[22] Filed: Jul. 16, 1998

[51] Int. Cl.⁷ .................................................. A01G 9/02
[52] U.S. Cl. ..................... 362/253; 362/431; 362/432; 362/122; 362/123; 362/154; 362/155; 47/59
[58] Field of Search .................... 362/253, 431, 362/432, 122, 123, 134, 805, 154, 155; 47/59, 67

[56] References Cited

U.S. PATENT DOCUMENTS 4,106,235  8/1978  Smith ............................................. 47/59
4,592,166  6/1986  Tendrup et al. ............................. 47/67
5,879,071  3/1999  Sanford, Jr. ............................... 362/154

*Primary Examiner*—Cassandra Spyrou
*Assistant Examiner*—Mohammad Y. Sikder
*Attorney, Agent, or Firm*—Fildes & Outland, P.C.

[57] ABSTRACT

A planter light accessory for illuminating a plant within a planter. The accessory includes a generally cylindrical housing having a side wall defining openings at upper and lower ends of the housing. The side wall supports a generally horizontal edge portion adjacent and extending outwardly from the opening at the upper end of the housing. A light source mounted on the edge portion for illuminating the plant.

8 Claims, 2 Drawing Sheets

PLANTER LIGHT ACCESSORY

FIELD OF THE INVENTION

This invention relates to the accent lighting of plants and, in particular, to a planter light accessory that is mountable on an existing planter and directly illuminates a plant therein.

BACKGROUND OF THE INVENTION

It is known in the art relating to accent lighting to illuminate a plant with a light source, such as a spotlight, track lighting, or other artificial lighting means. Such light sources are independent of a planter or container for the plant. While this lighting does an effective job of illuminating the plant, the installation of this type of lighting can be complicated and expensive.

It is also known to provide planters with lighting means for lighting a plant therein. The planters use indirect lighting to illuminate the plant within the planter. Also, there are planters that have means for directly lighting a plant therein. However, such planters cannot be used with existing planters. Accordingly, a light accessory that is mountable on an existing planter and directly illuminates the plant should fill a recognized commercial need.

SUMMARY OF THE INVENTION

The present invention provides a planter light accessory having means for directly lighting a plant within the planter.

The present invention also provides a light accessory having a high degree of ornamental and decorative value, which is simple in construction.

In addition, the present invention provides a light accessory that is mountable on an existing planter for illuminating a plant planted in the planter. Thus, eliminating the need to throw away an older planter and having to buy a new planter with lighting means for lighting a plant therein.

In carrying out the advantages of the invention, the planter light accessory includes a generally cylindrical housing having a side wall. The side wall defines openings at upper and lower ends of the housing. Also, the side wall supports an edge portion that is adjacent and extends outward from the opening at the upper end of the housing. A light source is mounted on the edge portion for illuminating the plant. The light accessory is slidable into an existing planter containing a plant to be illuminated.

These and other features and advantages of the invention will be more fully understood from the following detailed description of the invention taken together with the accompanying drawings.

DETAILED DESCRIPTION OF THE INVENTION

Figure 1:
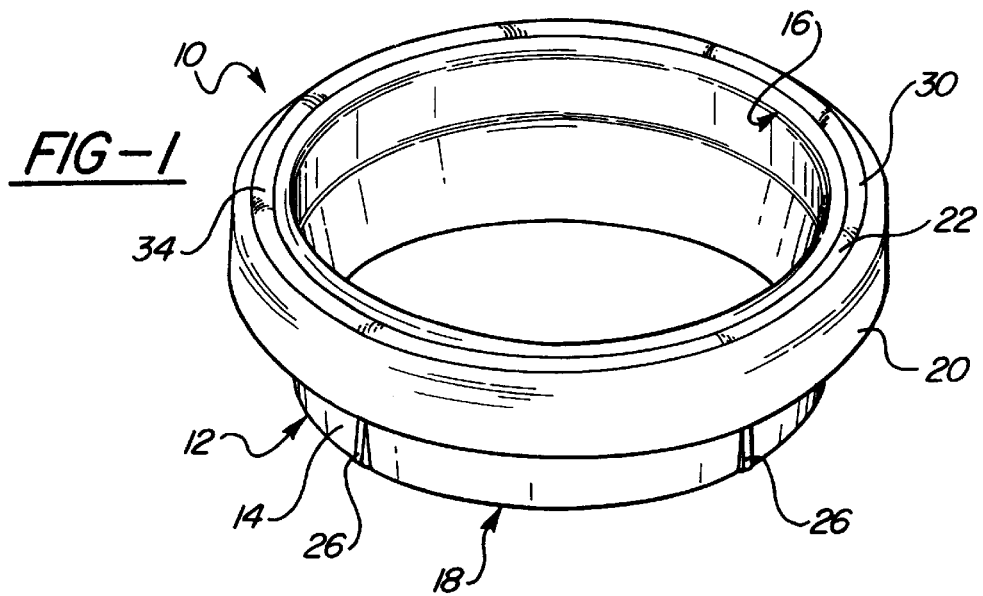
FIG. 1 is a pictorial view of a planter light accessory constructed in accordance with the present invention.
Figure 2:
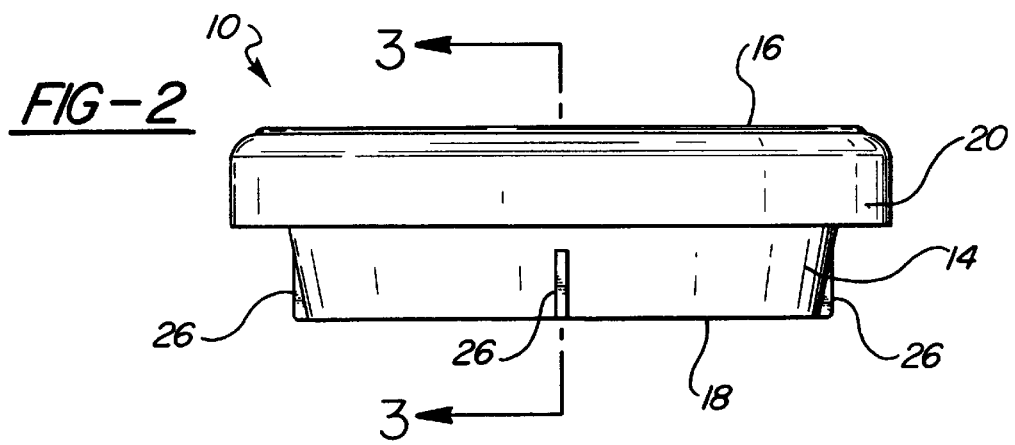
FIG. 2 is a pictorial view of the side of the planter light accessory.
Figure 3:
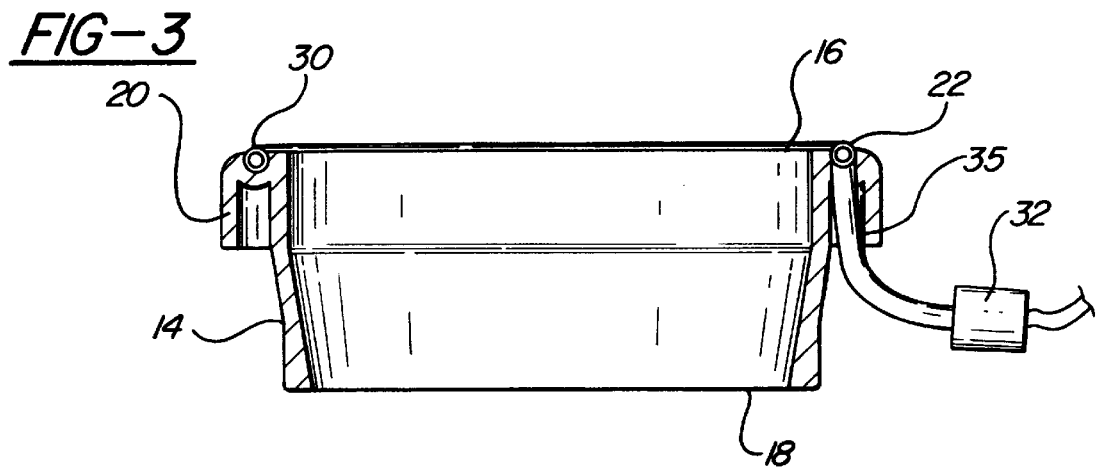
FIG. 3 is a cross-sectional view of the planter light accessory from the line 3—3 of FIG. 2.

Referring now to the drawings in detail, numeral generally indicates a planter light accessory mountable on an existing planter for illuminating a plant within the planter. Referring to FIGS. 1–3, the light accessory 10 comprising a generally cylindrical housing 12 having a side wall 14. The side wall 14 defines openings 16, 18 at upper and lower ends of the housing 12.

The side wall 14 supports an edge portion 20 that is adjacent and extends outward from the opening 16 at the upper end of the housing 12. A light source 22 is mounted on the edge portion 20 for illuminating the plant.

In a preferred embodiment, the planter light accessory 10 is molded out of plastic. The light accessory 10 is secured to the existing planter 24 by a plurality of resilient retaining ribs 26. Said ribs 26 are mounted on the exterior of the side wall 14 and spaced circumferentially around the side wall 14.

Figure 4:
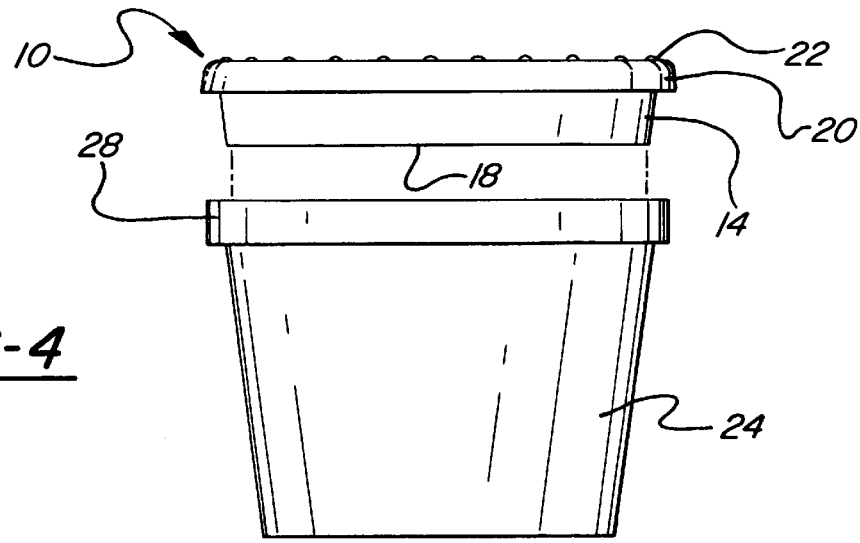
FIG. 4 is a side view of the planter light accessory illustrating the manner of mounting the light accessory to an existing planter.

In use, the light accessory 10 slides into the existing planter 24 as shown in FIG. 4. When the light accessory 10 is sliding into the planter 24, the ribs 26 are pushed into the side wall 14. Once the edge portion 20 is seated against an upper edge 28 of the existing planter 24, the light accessory 10 stops sliding and the ribs 28 pop out, securing the light accessory 10 in the planter 24.

The light source 22 is a fiber optic light assembly 30. The fiber optic light assembly 30 includes light means 32 for generating illumination and a fiber optic string 34 extending from the light means 32. The light means 32 can be a quartz halogen or a metal halide. The fiber optic string 34 is received through an opening 35 in the edge portion and mounted on the upper surface of the edge portion 20. Alternatively, the fiber optic string 34 can be molded into the edge portion 20.

Figure 5:
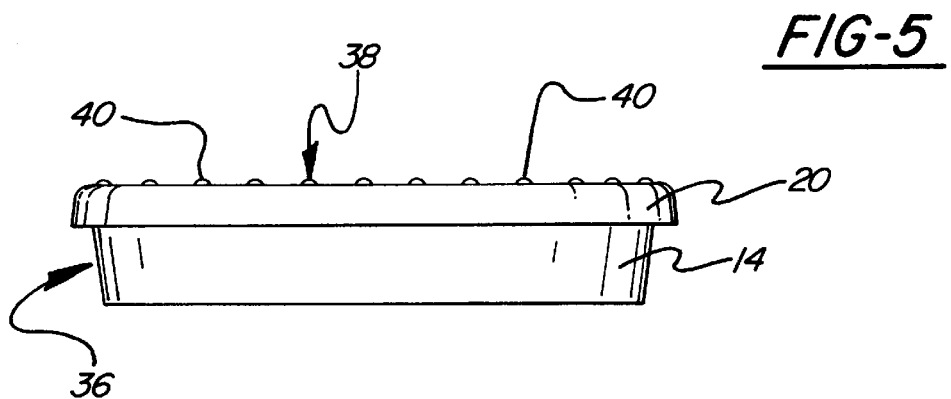
FIG. 5 is a pictorial view of the planter light accessory illustrating another embodiment of the invention wherein the light source is a plurality of incandescent light assemblies.

In another embodiment of the invention illustrated in FIG. 5, a light accessory 36 includes a light source 38 defined by a plurality of incandescent lighting assemblies 40 of known construction. The light assemblies 40 can be molded into the edge portion 20 of the side wall 14 or affixed to the edge portion 20 by bonding or mechanically fastened to the edge portion 20. Electrical wiring for the light assemblies 40 can be hidden under the edge portion 20 or preferably molded into the edge portion 20. Power supplied to the light assemblies 40 depends on the lights used.

Figure 6:
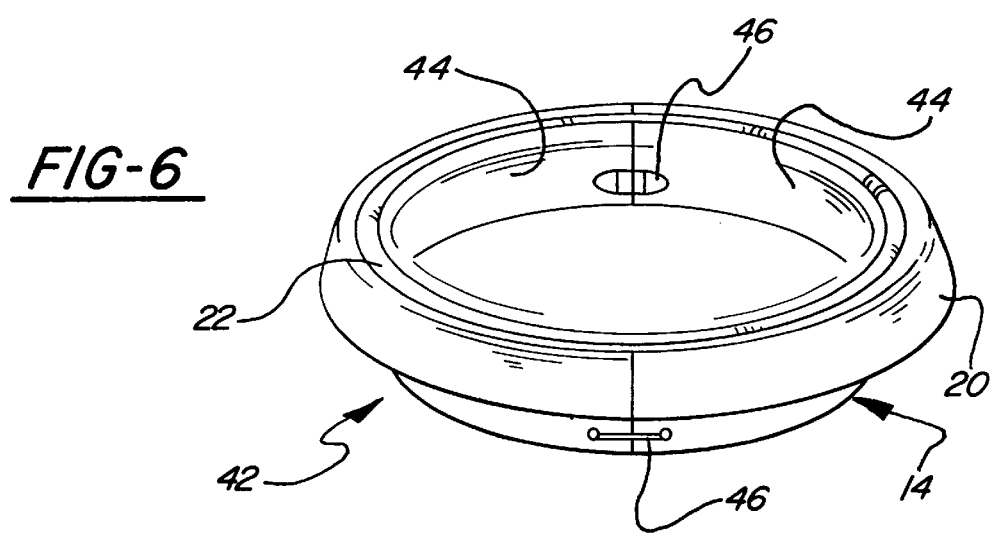
FIG. 6 is a pictorial view of the planter light accessory illustrating yet another embodiment of the invention wherein the side wall is circumferentially divided into a plurality of sections.

In yet another preferred embodiment illustrated in FIG. 6, the side wall 14 of light accessory 42 is circumferentially divided into a plurality of sections 44. The dividing of the side wall 14 allows the light accessory 42 to fit over a variety of planter sizes. The sections 44 are interconnected with fasteners 46.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A planter light accessory comprising:

a generally cylindrical housing having an upper end and a lower end, a side wall extending from said upper end of the housing to said lower end of the housing, wherein each of said upper end and lower end of the housing defines an opening, and said opening extending through said upper end and lower end of the housing;

said side wall supporting a horizontally disposed edge portion adjacent and extending outwardly from the opening at the upper end of the housing, said edge portion seatable against an upper end of an existing planter to be illuminated preventing the planter light accessory from sliding beyond a predetermined distance into the existing planter; and a light source mounted on said edge portion providing illumination of the plant.

2. The planter light accessory of claim 1 wherein the side wall is circumferentially divided along a vertical line into a plurality of sections and said sections are interconnected with fasteners.

3. The planter light accessory of claim 1 further comprising a plurality of resilient retaining ribs mounted on the exterior of the side wall and spaced circumferentially around the side wall for securing the light accessory in the existing planter.

4. The planter light accessory of claim 1 wherein the light source is a plurality of incandescent light assemblies.

5. The planter light accessory of claim 4 wherein the plurality of incandescent light assemblies are mounted on an upper surface of the edge portion.

6. The planter light accessory of claim 1 wherein the light source is a fiber optic light assembly having light means for generating illumuniaton and a fiber optic string.

7. The planter light accessory of claim 6 wherein the fiber optic string is mounted on an upper surface of the edge portion.

8. The planter light accessory of claim 6 wherein the fiber optic string is molded into the edge portion.

* * * * *